Figure 1:
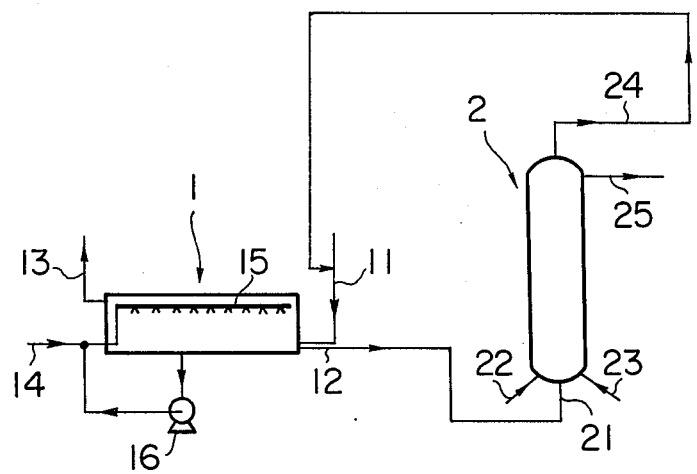

United States Patent [19]

Asakusa et al.

[11] 3,932,584
[45] Jan. 13, 1976

[54] METHOD FOR PURIFYING HYDROGEN SULFIDE-CONTAINING GAS

[75] Inventors: Tokuzo Asakusa; Taketoshi Honma; Isao Hirashita; Koichi Yasui; Yoshio Nishi; Koichi Murayama, all of Nobeokashi, Japan

[73] Assignee: Asahi Kasei Kogyo Kabushiki Kaisha, Japan

[22] Filed: Jan. 25, 1974

[21] Appl. No.: 436,721

[30] Foreign Application Priority Data
Feb. 2, 1973 Japan.................... 48-12901

[52] U.S. Cl. ............... 423/234; 423/521; 423/551; 423/571; 423/577
[51] Int. Cl.² ....................................... C01B 17/16
[58] Field of Search ........... 423/571, 551, 234, 521, 423/577

[56] References Cited
UNITED STATES PATENTS 3,471,249  10/1969  Markant et al. .................. 423/234
3,672,836  6/1972  Brown .............................. 423/571
3,718,732  2/1973  Winslow, Jr. et al. ............ 423/551
3,784,680  1/1974  Strong et al. ..................... 423/551
3,801,698  4/1974  Lowrance et al. ................ 423/234

Primary Examiner—Earl C. Thomas
Assistant Examiner—Wayne A. Langel
Attorney, Agent, or Firm—Armstrong, Nikaido & Wegner

[57] ABSTRACT

Hydrogen sulfide-containing waste gases whose complete treatment is indispensable from the viewpoint of environmental pollution problem, are purified in two steps consisting of a first step in which the gases are absorbed in an aqueous solution of sodium hydroxide or/and sodium sulfide, and a second step in which sulfuric acid and sulfur dioxide gas are simultaneously introduced into the resulting solution after absorption to deposit sulfur. Further, for recovery of the resulting sulfur, a particular apparatus is provided.

8 Claims, 5 Drawing Figures

METHOD FOR PURIFYING HYDROGEN SULFIDE-CONTAINING GAS

DESCRIPTION OF THE INVENTION

This invention relates to a process for removing hydrogen sulfide from an industrial waste gas containing hydrogen sulfide and purifying said gas. Further this invention relates to a process for recovering sulfur with a good efficiency from waste gases containing hydrogen sulfide and waste gases containing sulfur dioxide gas.

The environmental problem of air-contamination and occurrence of bad smell due to industrial waste gases containing hydrogen sulfide such as desulfurization gas in petroleum refining, coke oven gas, gas released at the time of evaporating the black liquor of kraft pulp manufacture, waste gas at excrement-treating place, waste gas evolved at the time of the production of viscose rayon, and cellophane, etc., has recently become more serious. Thus, a number of processes for removing hydrogen sulfide from industrial waste gases have heretofore been proposed such as absorption processes in which hydrogen sulfide is absorbed by aqueous solutions of sodium hydroxide, potassium triphosphate, etc. or ethanolamines, wet-type oxidation processes, e.g. Thylox process, Fumaks process, Takahax process, etc. in which hydrogen sulfide-containing gas is introduced into an aqueous solution of sodium carbonate in the presence of an oxidation catalyst, activated carbon processes in which hydrogen sulfide is adsorbed onto active carbon in the presence of oxidation catalyst, etc.

However, when the former two processes are employed among the first absorption processes, the resulting waste water cannot be discharged as it is, due to the strong alkalinity of sodium sulfide, sodium hydrosulfide or potassium hydrosulfide formed by the absorption. When this waste water is neutralized with acid, hydrogen sulfide is generated again. Thus, it becomes necessary to employ at the same time Claus process by which the resulting hydrogen sulfide is oxidized into sulfur in the presence of oxidation catalyst. However, this Claus process has drawbacks in that its conversion is low and moreover considerable amounts of unreacted hydrogen sulfide and formed sulfur dioxide gas contained in the tail gas are discharged. Further, the latter process has the drawback that monoethanolamine is not suitable as absorbent due to its volatility while diethanolamine and triethanolamine are not practical due to their slower absorption velocity.

The second wet-type oxidation process has not only a drawback that a highly dangerous catalyst such as arsenic, picric acid, etc. must be used, but also a fatal drawback in that the process is almost ineffective for the hydrogen sulfide-containing waste gas rich in air (oxygen) in the production of viscose rayon, due to its reaction mechanism.

Further the third activated carbon process necessitates regeneration of activated charcoal by extracting and separating sulfur deposited on activated carbon by absorption. This requires a large amount of solvent such as carbon disulfide, and further the handling of a large amount of carbon disulfide produced a great danger of ignition and explosion which requires a great deal of restriction such as the location of equipment and the control of operation.

The object of the present invention is to provide a process for purifying hydrogen sulfide-containing gases in which the above-mentioned drawbacks of the conventional art have been overcome. The particular object of the present invention is to provide a process for purifying a waste gas having a lower content of hydrogen sulfide but a higher content of air (oxygen), which is produced in the production of viscose rayon filament. Further, according to the present invention, it is possible to recover sulfur from said waste gas and at the same time to purify sulfur dioxide-containing waste gas.

The present invention resides in a process for purifying hydrogen sulfide-containing gases consisting of a first step in which a hydrogen sulfide-containing gas is absorbed in an aqueous solution of sodium hydroxide or/and an aqueous solution of sodium sulfide, and a second step in which sulfuric acid and sulfur dioxide are at the same time introduced into the resulting solution after absorption to deposit sulfur.

In the first step in which a hydrogen sulfide-containing gas is absorbed in an aqueous solution of sodium hydroxide or/and an aqueous solution of sodium sulfide as mentioned above, the following reactions proceed:

In case where the gas is absorbed in an aqueous solution of sodium hydroxide,
$$H_2S + 2NaOH \rightarrow Na_2S + 2H_2O,$$
and as further reaction
$$H_2S + Na_2S \rightarrow 2NaHS$$
and/or
$$H_2S + NaOH \rightarrow NaHS + H_2O$$

In case where the gas is absorbed in an aqueous solution of sodium sulfide,
$$H_2S + Na_2S \rightarrow 2NaHS$$

In the second step in which sulfuric acid and sulfur dioxide gas are introduced at the same time into the aqueous solution after absorption, the following reaction is carried out:
$$2NaHS + H_2SO_4 + SO_2 \rightarrow Na_2SO_4 + 2H_2O + 3S$$

In the first step, since it is necessary to form sodium hydrosulfide, an aqueous solution of sodium hydroxide or/and sodium sulfide is used. Further in this step, since the step is an inorganic reaction between an acidic gas and an aqueous solution of alkali, the reaction proceeds almost quantitatively. Thus, it is possible to remove hydrogen sulfide almost completely even from a waste gas containing hydrogen sulfide in a very low concentration. For example, this step is particularly effective for the purification of waste gas containing hydrogen sulfide usually in the order of about 20 ppm in which a greater portion of remaining part is air, and further carbon disulfide gas and carbon dioxide gas are contained, in the production of viscose rayon filament. This step is also effective for the treatment of waste gas containing methane, hydrogen, etc. in addition to hydrogen sulfide in the treatment of excrement, desulfurization gas containing various kinds of hydrocarbons in addition to hydrogen sulfide in petroleum refining, or the like. Although it is hard to establish a particular limitation to the concentration range of hydrogen sulfide, the step is usually applicable to waste gases having a hydrogen sulfide content of about several ppm to 100%. The absorption efficiency (removal efficiency of hydrogen sulfide) reaches 90% or higher in all cases.

Further, there is no particularly distinct limitation as to the concentration range of an aqueous solution of sodium hydroxide or/and sodium sulfide, as absorbent. Such a concentration range as about 0.02–9 mols of sodium hydroxide or/and sodium sulfide per 1 liter of said aqueous solution can be used and a range of 0.5–7 mols is particularly preferable.

In order to carry out the recovery of sulfur in the subsequent second step with good efficiency, it is advantageous to make the sodium hydrosulfide concentration of the solution resulting from the first step considerably higher, and it is preferable to arrange the concentration of the solution containing sodium hydroxide or sodium sulfide or the both in the range of 1–5 mols.

In addition, when sodium hydroxide is used as absorbent, the absorption of hydrogen sulfide-containing gases proceeds mainly in two steps as shown in the above equations, that is, sodium sulfide is first formed and then sodium hydrosulfide is attained. Accordingly, in order to elevate the efficiency of the use of sodium hydroxide, it is preferable to bring the conversion of sodium hydroxide into sodium hydrosulfide to as high a value as posible, i.e. close to 100%. Thus it is preferable to arrange reaction conditions in such a way that sodium hydroxide may be reacted with hydrogen sulfide in equimolecular relation.

The linear velocity at which hydrogen sulfide-containing gas is introduced into said aqueous solution is optional. 0.3–4 m/sec is particularly preferable. For example, about 0.1–7 m/sec can be preferably employed. Further, as for the liquid-gas ratio at this time, about 1/100 – 1/5000 by volume can be preferably employed. 1/500 – 1/3000 is particularly preferable. As for the absorption temperature, a particular temperature is not necessary. A range of 5°–70°C is preferable.

For the practice of the first step, there is no need of use of any special equipment. For example, there can be employed a very conventional vertical type absorbing column in which an absorbing solution is sprayed from the top part and allowed to fall downward, and a waste gas is introduced from the lower part to produce a counter-current flow; a horizontal type absorption apparatus in which an absorbing solution falls like rain from the top and waste gas is introduced from the lateral direction to give a crosswise current flow; a bubble cap tower; a cyclon scrubber; etc.

The liquid which contains absorbed gas and formed sodium hydrosulfide is subjected to the second step in which sulfuric acid and sulfur dioxide gas are simultaneously introduced to this liquid which has finished absorption. The reaction carried out in this second step is an inorganic chemical reaction as shown in the above-mentioned equation, which is completed almost instaneously. However, if it is broken up into parts in detail according to the elapse of time, the principal component of said aqueous solution i.e. sodium hydrosulfide is at first decomposed with sulfuric acid to form hydrogen sulfide. However, since the reaction system is in liquid phase, hydrogen sulfide is dissociated to produce $SH^-$ ion ($H_2S \rightleftharpoons SH^- + H^+$). This $SH^-$ attacks sulfur dioxide gas which is being charged, to form a labile addition product, which is immediately attacked by another $SH^-$ ion and decomposed into sulfur and water. This is a presumption of the mechanism of this reaction. Accordingly, it is a necessary condition of the present invention to carry out the second step reaction in liguid phase in view of the necessity for dissociating the hydrogen sulfide formed by decomposing sodium hydrosulfide with sulfuric acid, immediately into ions.

As a result, the second step of the present invention permits the treatment of sodium hydrosulfide more easily and with higher yield so as to be incomparable with conventional Claus processes which are carried out at a higher temperature, under a higher pressure and in the presence of a special catalyst for the gas phase radical reaction between hydrogen sulfide gas and sulfur dioxide gas.

In addition, since the second step of the present invention is, as mentioned above, carried out in liquid phase and moreover since the formed hydrogen sulfide is immediately dissociated into ions, there is no problem of hydrogen sulfide being released in the air. Thus, it can safely be said that this process of this invention is superior as compared with the Claus process.

Further it is to be noted that the above-mentioned effect is brought about by simultaneously introducing sulfuric acid and sulfur dioxide gas, and time lag in the introduction of the two materials is not preferable, because it does not enable attainment of the present invention.

In the second step, the absorbing solution which has finished the first step may be used as it is. There is no need of special concentration or dilution.

With regard to the concentration of sulfuric acid to be added, there is no need of special limitation. A concentration in the range of 1–300 g/l is preferable, but according to experimental results, it has been found that the concentration in the range of 4–150 g/l is particularly satisfactory.

When the recovery of sulfur is intended, the use of a relatively higher concentration of 100–150 g/l among the above mentioned range is desirable.

There is no need of any special limitation in the concentration of sulfur dioxide gas to be introduced. It is usually in the range of 0.15–100 vol.% and preferably in the range of 10–100%.

When generation of sulfur dioxide gas is intended by using the sulfur recovered from this step, it is preferable to select a concentration range of 10–15% by vol. in order to be conveniently used as a feed.

As for the proportion of sulfuric acid and sulfur dioxide gas, there is no need of a special limitation so long as they are nearly equivalent to the sodium hydrosulfide in the absorbing solution. This is due to the following reason: When sulfur dioxide gas is fed in an amount greater than the equivalent amount to the sodium hydrosulfide, the excessive sulfur dioxide gas is discharged in the unreacted state. Hence it is sufficient if it is driven off by aeration and returned to the first step to be absorbed again in the absorbent. To the contrary, when sulfur dioxide is fed in an amount less than the equivalent amount to the sodium hydrosulfide, it is possible to subject the reaction mixture discharged from the second step to aeration to drive off hydrogen sulfide gas and to return it to the first step.

As for the temperature of the second step, 5°–70°C is useful and 10°–50°C is preferable. However, in order to obtain sulfur with a better efficiency and to increase its particle size, 30°–50°C is most suitable.

As for the PH, the range of 1–6 is useful and the range of 1–5 is preferable but for the purpose of better separation of sulfur, the range of 1–3 is most suitable.

As for the reaction time of the second step, since the reaction is instantaneously completed, a time of 3 minutes or longer will usually be sufficient and the range of 30 to 90 minutes is preferable, but for the purpose for increasing the particle size of sulfur to make easier separation thereof, it is preferable to select the reaction time in the range of 30 to 90 minutes.

In the practice of the second step process there is no use of a special arrangement. For example an extremely simple reaction apparatus consisting of a cylindrical vessel equipped with an inlet for feeding reaction liquid, an inlet for feeding gas and a discharging outlet is useful.

However, if the recovery of sulfur is intended an apparatus hereinafter described, will be used advantageously.

Figure 2:
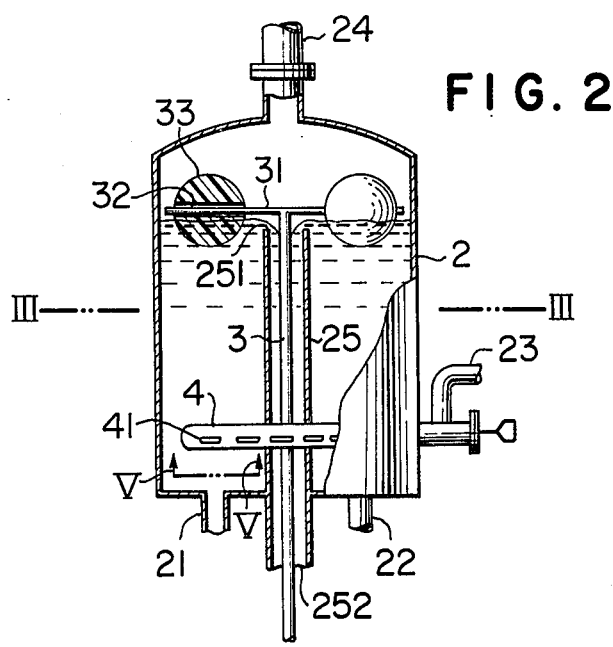
Figure 3:
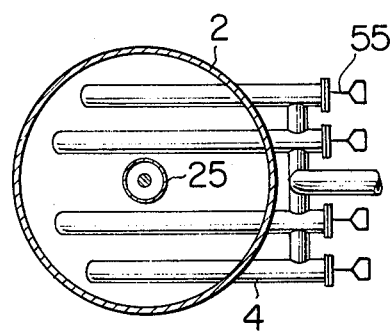
Figure 4:
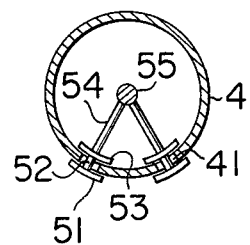
Figure 5:
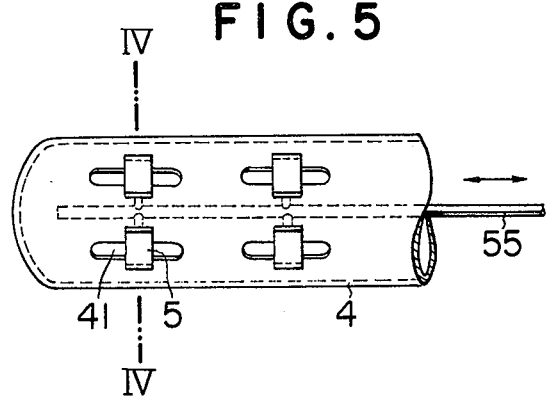

The method and the apparatus of the present invention will be more fully understood by referring to the accompanying drawings in which FIG. 1 shows a flow sheet of the method of the present invention. FIG. 2 is a schematic vertical sectional view of a reactor showing a rod with floats, overflow pipes and gas-blowing pipes by partly breaking away its wall; FIG. 3 is a schematic plan of a gas-blowing pipe viewed from line III—III of FIG. 2; FIG. 4 is a schematic sectional view of a gas-blowing pipe taken along line IV—IV of FIG. 5; and FIG. 5 is an enlarged schematic plan of a gas-blowing pipe viewed from line V—V of FIG. 2.

Referring now to FIG. 2, there is shown reactor 2 preferably used in the method of the present invention. In this reactor, there are provided inlet for feeding sulfuric acid 21, inlet for feeding absorption liquid from the first step 22, inlet for feeding SO$_2$ gas and outlet for discharging gas 24, and further cylindrical overflow pipe 25 extending vertically from the inlet 251 for overflow liquid (situated approximately in the center of the liquid surface), through the bottom wall of the reactor to the outlet 252 situated outside the bottom wall and gas-feeding pipes 4 having a number of gas-blowing holes 41.

Said vertical overflow pipe is provided with a long rod 3 loosely inserted throughout its whole length, having at least one branch rod 31 which extends horizontally at the end thereof appearing on the liquid surface and said branch carries at least one float 33. It is preferable that said branch loosely penetrates a central hole 32 of spheric float 33 made of light material but other connecting method of the branch with a float is also possible. These mechanism consisting of central rod, branch rods and floats is effective for preventing sulfur particles from depositing on the periphery of the inner wall of the reaction apparatus just above the liquid surface.

The above-mentioned gas-blowing hole 41 of the gas-feeding pipe 4 has a swing element 5 which does not wholly close the hole but is not detachable from the hole. Said swing element consists of portion 51 normally existing outside said blowing pipe 4, portion 53 normally existing inside said gas-blowing pipe and stem portion 52 normally inserted in hole 41 and connecting said two portions; said stem portion is freely movable in the hole, performing a swinging motion in accordance with the passage of gas through said hole and prevents the growth of deposited sulfur mass. It is preferable to make the shape of hole 41 in elongated form so as to permit the swing element in it to move freely. It is possible to extend the stem portion (as indicated by 54) toward the backside of the portion normally existing inside said gas-blowing pipe 4 so as to connect to a common rod 55 situated in the center of said gas-blowing pipe 4. In such an apparatus, it is possible to move the common rod 55 from the outside manually or automatically. It is also possible to use other kinds of swing element e.g. it is effective to pass a ring through two gas-bubbling holes.

As above-described in detail, it is a necessary condition for the present invention to carry out the first step in which a hydrogen sulfide-containing waste gas is absorbed in an aqueous solution of sodium hydroxide and/or sodium sulfide and then to carry out the second step in which sulfuric acid and sulfur dioxide gas are simultaneously introduced in said aqueous solution after the absorption, to deposit sufur. If either one of the two steps is carried out alone, the object of the present invention cannot be attained.

As above-described, the present invention is applicable to extremely wide range of industrial waste gases containing hydrogen sulfide. Particularly the present invention provides the most suitable method for treating a waste gas at the time of spinning in the production of viscose rayon filaments, which has a lower content of hydrogen sulfide but a higher content of air (oxygen) and has heretofore been regarded as having no suitable treating method therefor. Moreover it is not necessary that sodium hydroxide, sodium sulfide, sulfuric acid and sulfur dioxide gas used are pure materials. Even spent materials which have been used previously in industry are useful. For example, in case of the production of viscose rayon, a spent solution of sodium hydroxide used in steeping pulp and a spent aqueous solution of sodium sulfide used for desulfuring spun filaments, can be used as absorbent. Spent sulfuric acid used in spinning can be used in the second step. It is possible to use a waste gas from a thermal power plant, as sulfur dioxide gas. The sulfur dioxide gas such as those obtained in Wellman-Lord process or the like in which, for example, said waste gas is once absorbed in an aqueous solution of sodium sulfite and then it is stripped off, may be useful, but it is preferable to use a high concentration sulfur dioxide gas newly generated by burning the sulfur obtained in the method of the present invention because it increases yield further. Accordingly, if the present invention is applied to a viscose rayon manufacturing plant, it purifies not only the hydrogen sulfide in a waste gas but also it has a notable advantage in that the purification of spent aqueous solution of sodium sulfide which can be a source of pollution of waste water and the purification of exhaust smoke containing sulfur dioxide gas from a thermal power plant can be simultaneously carried out. It can be said that the method of the present invention is extremely advantageous method.

From the waste water in the method of the present invention, it is possible to easily recover elemental sulfur, if necessary after aeration, and by subjecting to a known solid-liquid separation method e.g. sedimentation, filteration, etc. followed by water-washing, drying and if necessary further by melting. On the other hand, the waste water, after separated from sulfur, contains by-produced sodium sulfate and an excessive amount of sulfuric acid. It can be thrown away into a stream after neutralization with an alkaline substance.

Further the method of the present invention can be carried out in either of both manners i.e. in continuous manner or batchwise.

EXAMPLE 1

The first step described herein before was at first carried out. As shown in FIG. 1, by using a horizontal type spray scrubbing apparatus 1, an aqueous solution of sodium sulfide having a concentration of 120 g/L fed at a rate of 18.4 L per hour from liquid-feeding pipe 14 in the form of spray through spraying nozzle 15 into the inside of the apparatus; said horizontal type spray scrubbing apparatus having a square cross-section of 1.35 m sides and a length of 7 m, and equipped with gas-feeding pipe 11 and liquid-discharging pipe 12 at one end, gas-discharging pipe 13 and liquid-feeding pipe 14 at the other end and spraying nozzles 15 connected to said liquid-feeding pipe 14 in the inside thereof. On the other hand, air containing 30 ppm of hydrogen sulfide was introduced from gas-feeding pipe 11 into said apparatus at a rate of 280 Nm$^3$ per minute and a linear velocity of 4.5 m/sec. to contact said air with the sprayed absorbing solution. Further the absorbing solution contacted with the gas and collected on the bottom of the apparatus, was circulated by circulating pump 16 installed outside the system at a rate of 200 L/min and sprayed repeatedly together with new absorbing solution. Further the reaction was carried out at ambient temperature. As a result, the waste gas from gas-discharging pipe 13 was composed almost of air and the content of hydrogen sulfide was reduced to 2–3 ppm. On the other hand, the absorbing solution having absorbed hydrogen sulfide (hereinafter referred to merely as absorbing solution) discharged from liquid-discharging pipe 12 was observed, whereby it was found that the discharged amount was 19.0 L/hour, and the liquid contained 117 g/L of sodium hydrosulfide, 10 g/L of sodium sulfide, 4 g/L of sodium sulfate and 13 g/L of sodium bicarbonate.

Next, the second step described herein before was carried out. Said absorbing solution was fed, as it was, into a cylindrical type reaction apparatus 2 from the bottom; said apparatus having an inner diameter of 20 cm and a height of 1 m, and equipped with feeding pipes 21, 22 and 23 absorbing solution, sulfuric acid and sulfur dioxide gas, respectively, at the bottom, and gas-discharging pipe 24 and liquid-discharging pipe 25 enabling to overflow the liquid, at the top.

Further, from the bottom were fed 62 g/L of sulfuric acid at a rate of 49.6 L/hour and air containing sulfur dioxide in a concentration of 9% at a rate of 5.6 N m$^3$/hour. This step was carried out also at ambient temperature. As a result, waste water having a concentration of sodium sulfate of 66 g/L, a concentration of sulfuric acid of 5 g/L and containing sulfur was discharged by overflowing at a rate of 68 L/hour. This discharged liquid was filtered with an Oliver filter and after continuous operation for 10 hours, 19.4 kg of sulfur as simple substance based upon the weight after drying was obtained. The purity of the sulfur was 99.6%. In addition, from gas-discharging pipe 24 at the top of said reaction apparatus was discharged air containing steam. This air contained only hydrogen sulfide and sulfur dioxide in amounts of 1.0 ppm and 0.5 ppm, respectively.

EXAMPLE 2

The first step was at first carried out as in Example 1. By using a spray type scrubbing apparatus of the same type as in Example 1 except that its cross-section was 60 cm square and its length was 4 m, 150 g/L of aqueous solution of sodium hydroxide was fed through a liquid-feeding inlet at a rate of 86.7 L/hour under spraying, and at the same time, air containing 15000 ppm of hydrogen sulfide was introduced through a gas-feeding inlet into said apparatus at a rate of 400 N m$^3$/Hr. and at a linear velocity of 0.3 m/second. As the reaction temperature, ambient temperature was used. As a result, hydrogen sulfide in the waste gas from the gas-discharging outlet was reduced to 750 ppm and its percentage removal was 95%. On the other hand, from the liquid-discharging outlet, absorbing solution after absorption having a sodium hydrosulfide concentration of 125.6 g/L, a sodium sulfide concentration of 20.4 g/L, a sodium sulfate concentration of 26.8 g/L and a sodium carbonate concentration of 20.3 g/L, respectively, was discharged at a rate of 87 L/hour.

Next, the second step was carried out as in Example 1. The above-mentioned discharged liquid was fed, as it was, into a reaction apparatus from the bottom thereof in a manner similar to Example 1, said reaction apparatus being of the same type as in Example 1 except that the inner diameter was 50 cm. Further, from the bottom, sulfuric acid having a concentration of 70 g/L was fed at a rate of 230 L/hour and air containing sulfur dioxide gas in a concentration of 9% was fed at a rate of 29.2 Nm$^3$/hour, into said apparatus. As the reaction temperature, ambient temperature was used. As a result, a discharging liquid containing 73 g/L of sodium sulfate, 5.6 g/L of sulfuric acid and sulfur was discharged as overflow at a rate of 316.7 L/hour. This discharged liquid was passed through a settling vessel to precipitate sulfur, whereby 97.5 kg based upon the dried weight was obtained after continuous operation for 10 hours. Result of analysis showed that this sulfur had 99.0% purity. Further, air containing steam was discharged from a gas-discharging outlet at the top of the apparatus, and it was found that the waste gas contained only 10 ppm of hydrogen sulfide and 5 ppm of sulfur dioxide.

EXAMPLE 3

Spray type scrubber of the same type as in Example 2 was employed. A mixed solution as an absorbing solution, of sodium hydroxide and sodium sulfide whose concentrations were 86 and 54 g/L, respectively, was fed through a liquid-feeding pipe into the scrubber at a rate of 100 L/Hr. The solution was sprayed through spraying nozzles. On the other hand, air containing 15,000 ppm of hydrogen sulfide was introduced through a gas-feeding pipe into the scrubber at a rate of 400 Nm$^3$/hr and at a linear velocity of 0.3 m/sec to contact the sprayed absorbing solution.

The absorbing solution collected on the bottom of the scrubber after flowing down in contact with the gas, was circulated by a circulation pump outside the system at a rate of 100 L/min so that the solution might be repeatedly sprayed together with a fresh absorbing solution.

The reaction was carried out at ambient temperature. As a result, the content of hydrogen sulfide in the discharged gas through a gas-discharging pipe was reduced to 750 ppm, while the absorbing solution having absorbed hydrogen sulfide and discharged through a liquid-discharging pipe amounted to 108 L/hr and contained 134 g/L of sodium hydrosulfide, 20 g/L of sodium sulfide, 15 g/L of sodium carbonate, etc.

This absorbing solution was fed, as it was, into a reaction apparatus of the same type as in Example 2, and further 74 g/L of sulfuric acid solution and air containing sulfur dioxide gas in 10% concentration were fed at rates of 252 L/hr and 33.0 N m$^3$/hr, respectively, and reaction was carried out at ambient temperature.

As a result, a spent solution containing 68 g/L of sodium sulfate, 5 g/L of sulfuric acid and sulfure was discharged through a liquid-discharging pipe at a rate of 360 L/hr under overflow. This discharged solution was filtered through an Oliver filter. After continuous operation for 10 hours, 128 kg of simple substance of sulfur having a purity of 97.5% was obtained, while air containing steam was discharged through a gas-discharging pipe, which air contained only 10 ppm of hydrogen sulfide and 4 ppm of sulfur dioxide gas.

What is claimed is:

1. A method for purifying hydrogen sulfide-containing gas which comprises a first step of absorbing a hydrogen sulfide-containing gas in an aqueous solution of sodium hydroxide and/or sodium sulfide to obtain a solution containing sodium hydrosulfide, and a second step of introducing sulfuric acid and sulfur dioxide gas simultaneously into said aqueous solution after absorption while maintaining a reaction temperature of 5°–70°C and a pH of 1–6 to form sodium sulfate and to deposit sulfur.

2. A method according to claim 1 wherein said hydrogen sulfide-containing gas is a waste gas which is generated at the time of the production of viscose rayon or cellophane.

3. A method according to claim 1 wherein the concentration of said aqueous solution of sodium hydroxide and/or sodium sulfide to be used in the first step is 0.02–9 mols of sodium hydroxide and/or sodium sulfide per 1 L of said aqueous solution.

4. A method according to claim 1 wherein the linear velocity for introducing hydrogen sulfide-containing waste gas into said aqueous solution is 0.1–7 m/sec.

5. A method according to claim 1 wherein the liquid: gas ratio in the first step is 1/100–1/5000 by volume.

6. A method according to claim 1 wherein the concentration of sulfuric acid to be used in the second step is 1–300 g/L, and the concentration of sulfur dioxide gas to be introduced in the second step is 0.15–100 % by volume.

7. A method according to claim 1 wherein the concentration of the aqueous solution of sodium hydroxide or/and sodium sulfide is 1–5 mols of sodium hydroxide or/and sodium sulfide per 1 L of said aqueous solution; the concentration of sulfuric acid is 100–150 g/L; and in the second step, the reaction temperature is 30°–50°C, the reaction time is 30–90 minutes and the pH is 1–3.

8. The method of claim 1 which includes the further step of burning said deposited sulfur to form sulfur dioxide and returning said sulfur dioxide to the second step of the process.

* * * * *